United States Patent
Bertini et al.

(10) Patent No.: US 12,338,746 B2
(45) Date of Patent: Jun. 24, 2025

(54) AERODYNAMICALLY MISTUNED AIRFOILS FOR UNSTEADY LOSS REDUCTION

(71) Applicants: General Electric Company, Schenectady, NY (US); GE Avio S.r.l., Turin (IT)

(72) Inventors: Francesco Bertini, Turin (IT); Davide Torzo, Turin (IT); Pratish Patil, Bengaluru (IN); John Joseph, Bengaluru (IN); Mahendran Manoharan, Bengaluru (IN); Ganesh Seshadri, Bengaluru (IN)

(73) Assignees: General Electric Company, Schenectady, NY (US); GE Avio S.r.l., Turin (IT)

( * ) Notice: Subject to any disclaimer, the term of this patent is extended or adjusted under 35 U.S.C. 154(b) by 0 days.

(21) Appl. No.: 18/635,858

(22) Filed: Apr. 15, 2024

(65) Prior Publication Data
US 2024/0254884 A1 Aug. 1, 2024

Related U.S. Application Data

(62) Division of application No. 17/951,653, filed on Sep. 23, 2022, now abandoned.

(30) Foreign Application Priority Data
Mar. 21, 2022 (IN) .............................. 202211015402

(51) Int. Cl.
*F01D 5/14* (2006.01)
(52) U.S. Cl.
CPC ........ *F01D 5/142* (2013.01); *F05D 2220/323* (2013.01); *F05D 2240/12* (2013.01); *F05D 2240/30* (2013.01)

(58) Field of Classification Search
CPC . F01D 9/041; F01D 5/146; F01D 5/16; F01D 9/06; F01D 9/02; F01D 9/042;
(Continued)

(56) References Cited

U.S. PATENT DOCUMENTS 9,650,915 B2 * 5/2017 Calza ....................... F01D 5/16
9,745,850 B2 8/2017 Guendogdu et al.
(Continued)

FOREIGN PATENT DOCUMENTS

EP 2861827 9/2018

OTHER PUBLICATIONS

United States Patent and Trademark Office, "Restriction Requirement," issued Mar. 13, 2023 in connection with U.S. Appl. No. 17/951,653, 6 pages.
(Continued)

*Primary Examiner* — Eric J Zamora Alvarez
(74) *Attorney, Agent, or Firm* — Wood Herron & Evans LLP

(57) ABSTRACT

Aerodynamically mistuned airfoils for unsteady loss reductions are disclosed herein. An example apparatus disclosed herein includes a disk, a first airfoil coupled to the disk, the first airfoil having a first geometry, and a second airfoil coupled to the disk adjacent to the first airfoil, the second airfoil having a second geometry different than the first geometry, the first airfoil and the second airfoil produce non-uniform wake passing times during operation of the disk.

12 Claims, 14 Drawing Sheets

(58) Field of Classification Search
CPC .......... F01D 9/065; F01D 25/06; F01D 5/143; F01D 5/142; F01D 5/145; F01D 5/141; F01D 1/04; F01D 5/147; F01D 9/04; F01D 1/023; F01D 11/008; F01D 5/14; F01D 5/148; F01D 5/225; F01D 5/30; F05D 2260/96; F05D 2260/961; F05D 2220/32; F05D 2220/323; F05D 2240/128; F05D 2240/12; F05D 2240/129; F05D 2250/30; F05D 2250/37; F05D 2240/30; F05D 2240/301; F05D 2240/304; F05D 2240/303; F05D 2240/306; F05D 2240/305; F05D 2240/122; F05D 2240/121; F05D 2240/124; F05D 2240/80; F04D 29/544; F04D 29/666; F04D 29/328; F04D 29/324; F04D 29/327; F04D 29/384; Y02T 50/60

See application file for complete search history.

(56) References Cited

U.S. PATENT DOCUMENTS

| | | | |
|---|---|---|---|
| 9,810,082 B2* | 11/2017 | Calza | F01D 9/041 |
| 2012/0099995 A1* | 4/2012 | Delvaux | F01D 5/30 29/889.21 |
| 2016/0146040 A1 | 5/2016 | Simpson et al. | |
| 2020/0362713 A1* | 11/2020 | Bertini | F01D 5/146 |
| 2023/0296024 A1 | 9/2023 | Bertini et al. | |

OTHER PUBLICATIONS

United States Patent and Trademark Office, "Non-Final Office Action," issued Aug. 9, 2023 in connection with U.S. Appl. No. 17/951,653, 11 pages.

United States Patent and Trademark Office, "Final Office Action," issued Dec. 13, 2023 in connection with U.S. Appl. No. 17/951,653, 11 pages.

\* cited by examiner

AERODYNAMICALLY MISTUNED AIRFOILS FOR UNSTEADY LOSS REDUCTION

RELATED APPLICATION

This patent arises from a division of U.S. patent application Ser. No. 17/951,653, filed on Sep. 23, 2022 entitled "AERODYNAMICALLY MISTUNED AIRFOILS FOR UNSTEADY LOSS REDUCTION," which claims priority to Indian Patent Application No. 202211015402, which was filed on Mar. 21, 2022, and which is incorporated herein by reference in its entirety.

FIELD OF THE DISCLOSURE

This disclosure relates generally to gas turbines, and, more particularly, to aerodynamically mistuned airfoils for unsteady loss reduction.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section. A gas turbine engine produces a thrust that propels a vehicle forward, e.g., a passenger aircraft. The thrust from the engine transmits loads to a wing mount, e.g., a pylon, and, likewise, the vehicle applies equal and opposite reaction forces onto the wing via mounts.

BRIEF DESCRIPTION OF THE DRAWINGS

A full and enabling disclosure of the present described technology, including the best mode thereof, directed to one of ordinary skill in the art, is set forth in the specification, which makes reference to the appended Figures, in which.

Figure 1:
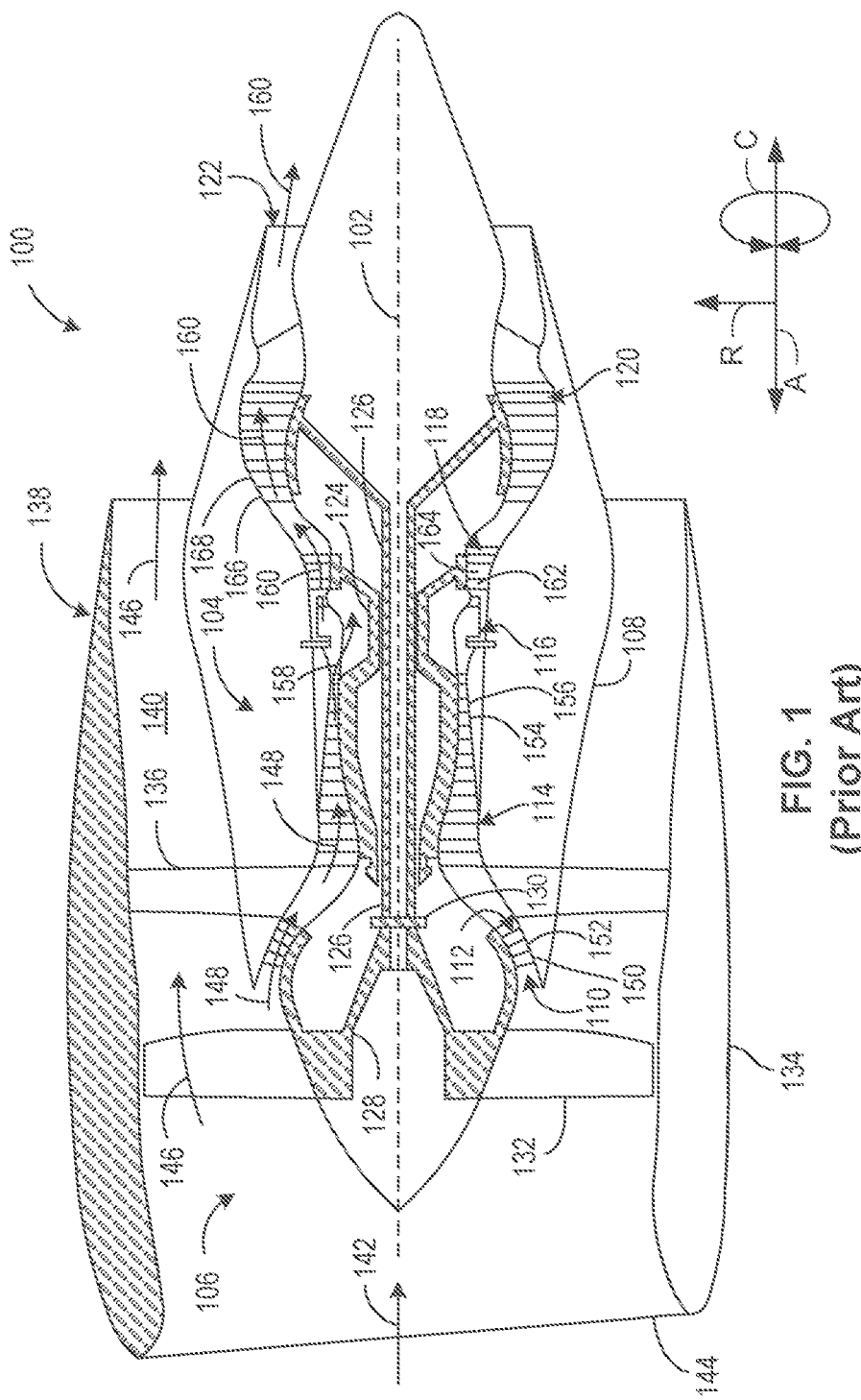
FIG. 1 illustrates a cross-sectional view of a prior gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Examples disclosed herein include graphical representations of wake fields generated by airfoils. In the examples disclosed herein, various portions of the wake field are illustrated with dot matrices shadings. Unless stated otherwise, the denser and/or darker portions dot matrices represent portions of the wake fields with comparatively greater entropies. The dot matrices shadings are included for illustrative purposes and are only included to illustrate the comparative flow properties of the wake fields described herein. Repeated and/or similar shading used in different figures does not indicate the corresponding portions of the wake field have the same properties.

DETAILED DESCRIPTION

The aerodynamics of the interior flow paths of turbomachinery is inherently unsteady. Wakes from upstream static and rotating airfoil rows, periodically pass through downstream airfoil rows, thereby impacting the aerodynamics, aeromechanical, and the aero-acoustic behavior of the downstream airfoils, the stage associated with the downstream airfoils, and the turbomachinery as a whole. Many prior airfoil rows include airfoils with uniform geometry and spacing that generate a uniform downstream wake. These prior uniform airfoil rows can cause unsteady losses and related problems, such as flutter, unfavorable acoustic response, and/or the cyclic stall of compressors. Examples disclosed include aerodynamically mistuned airfoils that create different flow characteristics and/or patterns (e.g., different wake passing times, different wake speeds, different pressure load distribution, different trailing edge wake entropy shapes, etc.) in circumferentially adjacent channels of downstream airfoil rows to mitigate the detrimental effects caused by wake-passing times. Examples disclosed herein include airfoils rows with non-uniform geometry (e.g., thickness profiles, thickness-to-chord ratios, pressure distributions, etc.) that decouple the frequency of downstream wake passing patterns, thereby improving the aerodynamic, and aeromechanics of the stage, section and gas turbine engine as a whole.

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. In general, the attached figures are annotated with reference to the axial direction, radial direction, and circumferential direction of the gas turbine associated with the features, forces and moments. In general, the attached figures are annotated with a set of axes including the axial axis A, the radial axis R, and the circumferential axis C. As used herein, the terms "longitudinal," and "axial" are used interchangeably to refer to directions parallel to the axial axis. As used herein, the terms "lateral," "tangential," and "circumferential" are used to refer to directions parallel to the circumferential axis. As used herein, the term "radial" is used to refer to directions parallel to the radial axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

When an airfoil encounters a flow, a portion of the flow adheres to the airfoil as a boundary layer. When the boundary layer of the flow reaches the trailing edge of the airfoil, the boundary layer separates from the airfoil and forms a highly turbulent flow pattern, referred to herein as a wake. Wake is often more turbulent/entropic than the surrounding flow. In turbomachinery, wake generated by upstream airfoil rows is experienced by downstream airfoil rows. Many prior turbomachinery airfoil rows include airfoils with uniform spacing and geometry, due to manufacturing ease and disk balancing. The wake generated by uniform airfoil rows generates uniform wake passing times, which can generate substantial impacts on the aerodynamics, aeromechanics, and aero-acoustics behavior of the downstream airfoils, stage, and the section overall. The wake generated by uniform airfoil rows encounters downstream rows in periodic patterns. Accordingly, the uniform airfoil rows cause the flow through downstream channels to be highly unsteady (e.g., time-dependent, etc.), which can have detrimental effects on the aerodynamics, aeromechanics, and aero-acoustics behavior on the airfoils associated with these downstream channels.

Examples disclosed herein include airfoil rows with non-uniform airfoils to mitigate the detrimental effects caused by uniform wake-passing times. Examples disclosed herein include airfoil rows with adjacent airfoils of different geometries and/or spacing. Examples disclosed herein include airfoil rows including patterns with between two to four different airfoil geometries. Examples disclosed herein are applicable to stator rows and/or rotor rows.

Examples disclosed herein include airfoil rows that include airfoils with different chord-ratios, thickness distributions, pressure loading (e.g., front-loaded pressure distributions, aft-loaded pressure distributions, etc.), chord lengths, spacings, and/or combinations thereof. Examples disclosed herein generate different wake passing times in downstream channels, thereby enabling to the reduction of negative unsteady flow impacts, thus offering, reduced flutter issues, decreased profile losses, and improved forced response dumping, when compared to prior designs.

Referring now to the drawings, wherein identical numerals indicate the same elements throughout the figures, FIG. 1 is a schematic cross-sectional view of a prior turbofan 100. As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan airfoils 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor airfoils 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor airfoils 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor airfoils 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor airfoils 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2A:
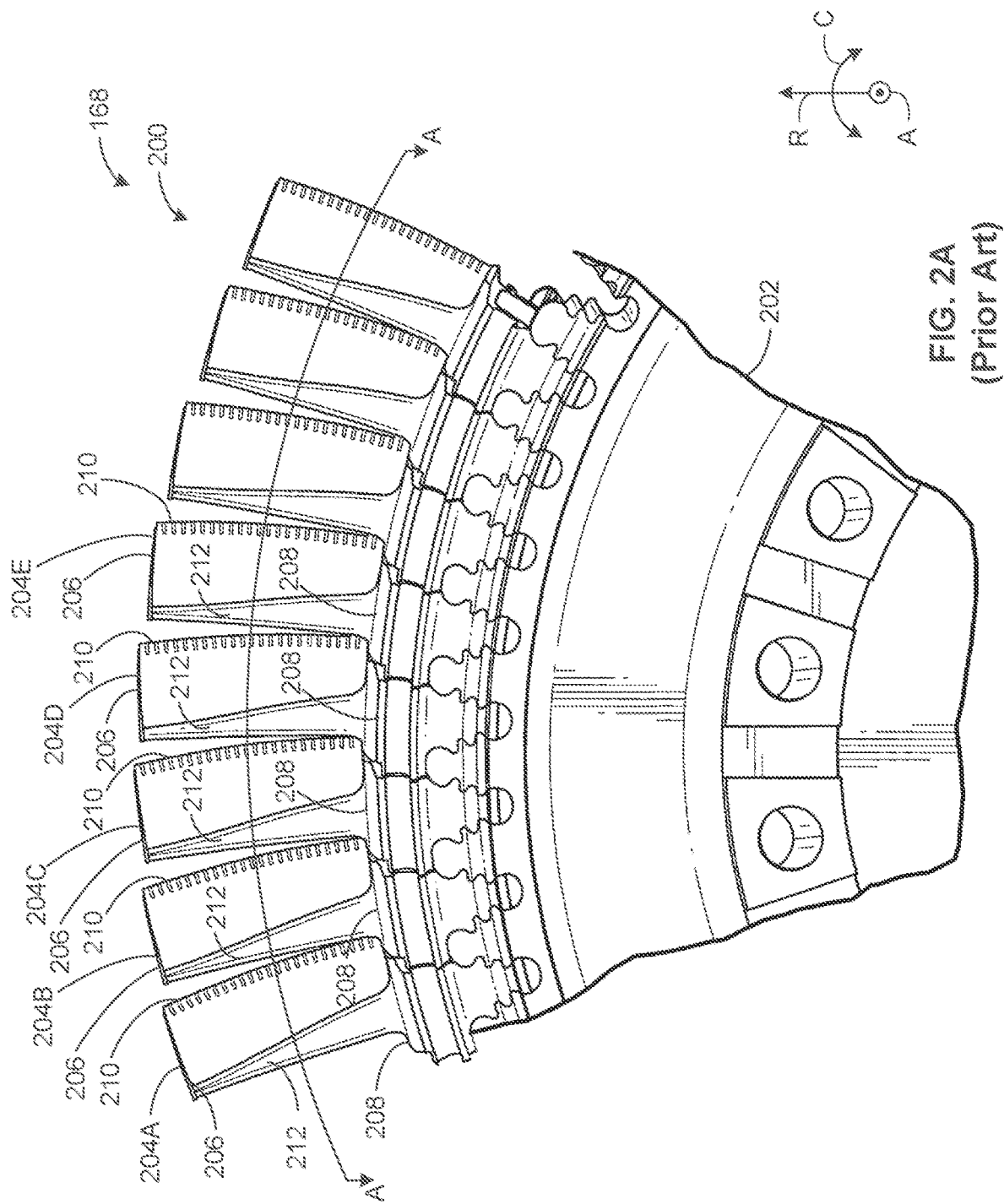
FIGS. 2A and 2B illustrate an example of a portion of a prior row of airfoils that may be used in association with the gas turbine engine of FIG. 1.

FIG. 2A is a front view of a portion 200 of the LP turbine rotor airfoils 168 of FIG. 1. In FIG. 2A, the portion 200 includes a disk 202 including a first airfoil 204A, a second airfoil 204B, a third airfoil 204C, a fourth airfoil 204D, and a fifth airfoil 204E. In FIG. 2A, each of the airfoils 204A, 204B, 204C, 204D, 204E includes a tip 206, a root 208, a leading edge 210, and a trailing edge 212. In FIG. 2A, the airfoils 204A, 204B, 204C, 204D have a uniform geometry (e.g., a same size and shape, etc.) and are evenly spaced circumferentially around the disk 202. The roots 208 of each of the airfoils 204A, 204B, 204C, 204D is disposed adjacent to the disk and the tips 206 are distal from the disk 202. In FIG. 2A, the axial position of each of the leading edges 210 is the same and the axial position of each of the trailing edges 212 is the same.

Figure 2B:
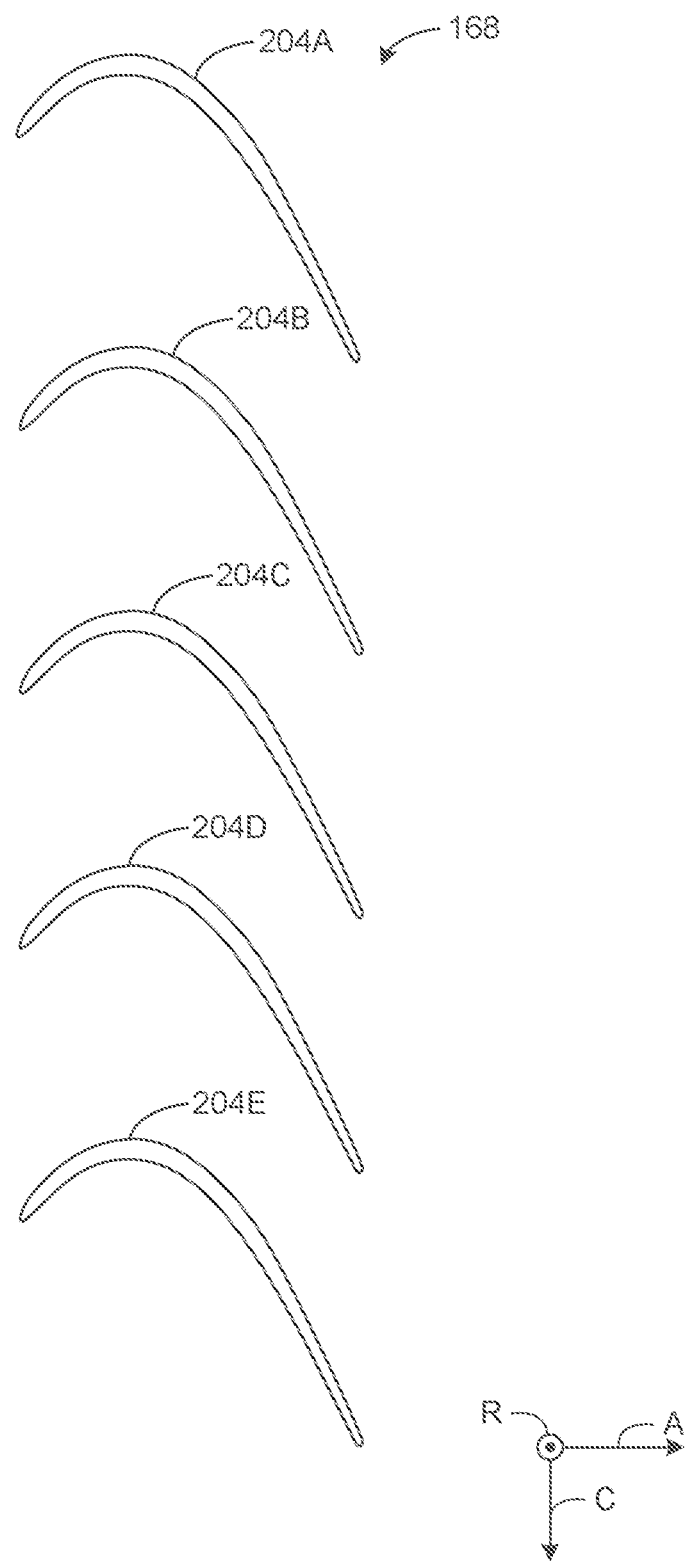
Figure 2C:
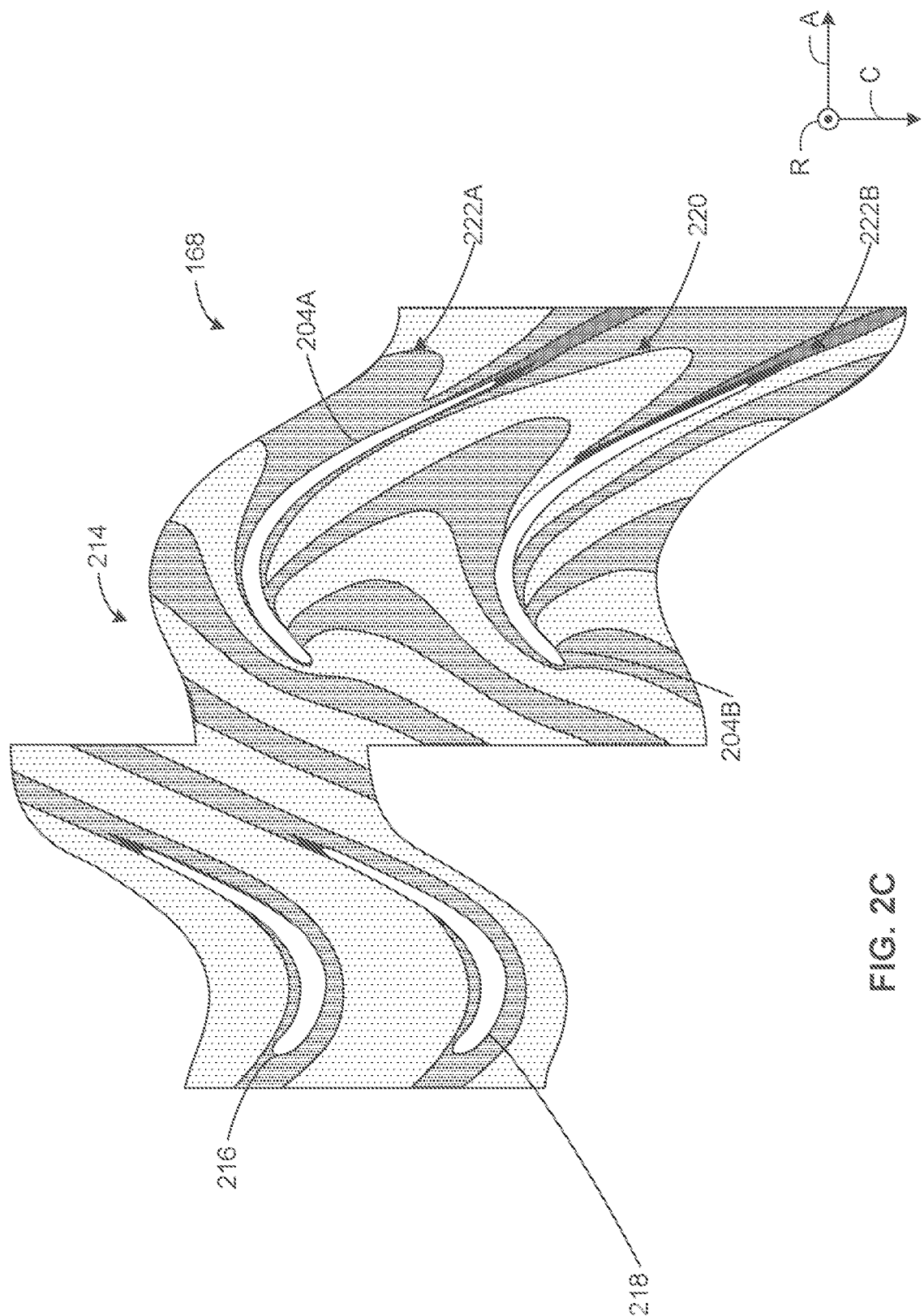
FIG. 2C illustrates a wake field generated by the prior airfoils of FIGS. 2A and 2B during operation of the gas turbine engine of FIG. 1.

FIG. 2B illustrates a cross-section of the airfoils 204A, 204B, 204C, 204D along the line A-A of FIG. 2A. In FIG. 2B, the airfoils 204A, 204B, 204C, 204D are evenly spaced around circumferential axis C. In FIG. 2B, the airfoils 204A, 204B, 204C, 204D are uniform and they have the same thickness, curvature profiles, axial pressure distributions, chord-ratio, etc. FIG. 2C illustrates a wake field 214 generated by the prior airfoils 204A, 204B and a first upstream airfoil 216 and a second upstream airfoil 218. In FIG. 2C, the prior airfoils 204A, 204B define a channel 220. As used herein, the term "wake field" refers to the patterns of recirculating flow caused by contact of the flow forming behind an airfoil row. In examples illustrated herein, darker regions of a wake field correspond to comparatively higher entropy (e.g., higher turbulence, etc.) portions of the flow and lighter regions of a wake field correspond to comparatively lower entropy.

In FIG. 2C, the wake field 214 generated by the upstream airfoils 216, 218 and the other airfoils of the airfoil row passes through the channels created by the downstream airfoil row associated with the portion 200. The airfoils 202A, 202B define a channel 220, which is circumferentially adjacent to the adjacent channels 222A, 222B. In FIG. 2C, the airfoils 202A, 202B are uniform in size. As such, the wake generated by the upstream airfoils 216, 218 passes through the channels associated with the airfoils 168 (e.g., the channels 220, 222A, 222B, etc.) in a uniform and periodic manner. Because the wake passing times and/or other wake characteristics of the wake field 214 in the channels 220, 222A, 222B are uniform and periodic, the wake field 214 can cause flutter in the airfoils 202A, 202B, 216, 218, negative aerodynamic effects for other components of the LPT (e.g., downstream airfoils of the LPT, etc.), and/or other negative resonant/harmonic effects.

Figure 3A:
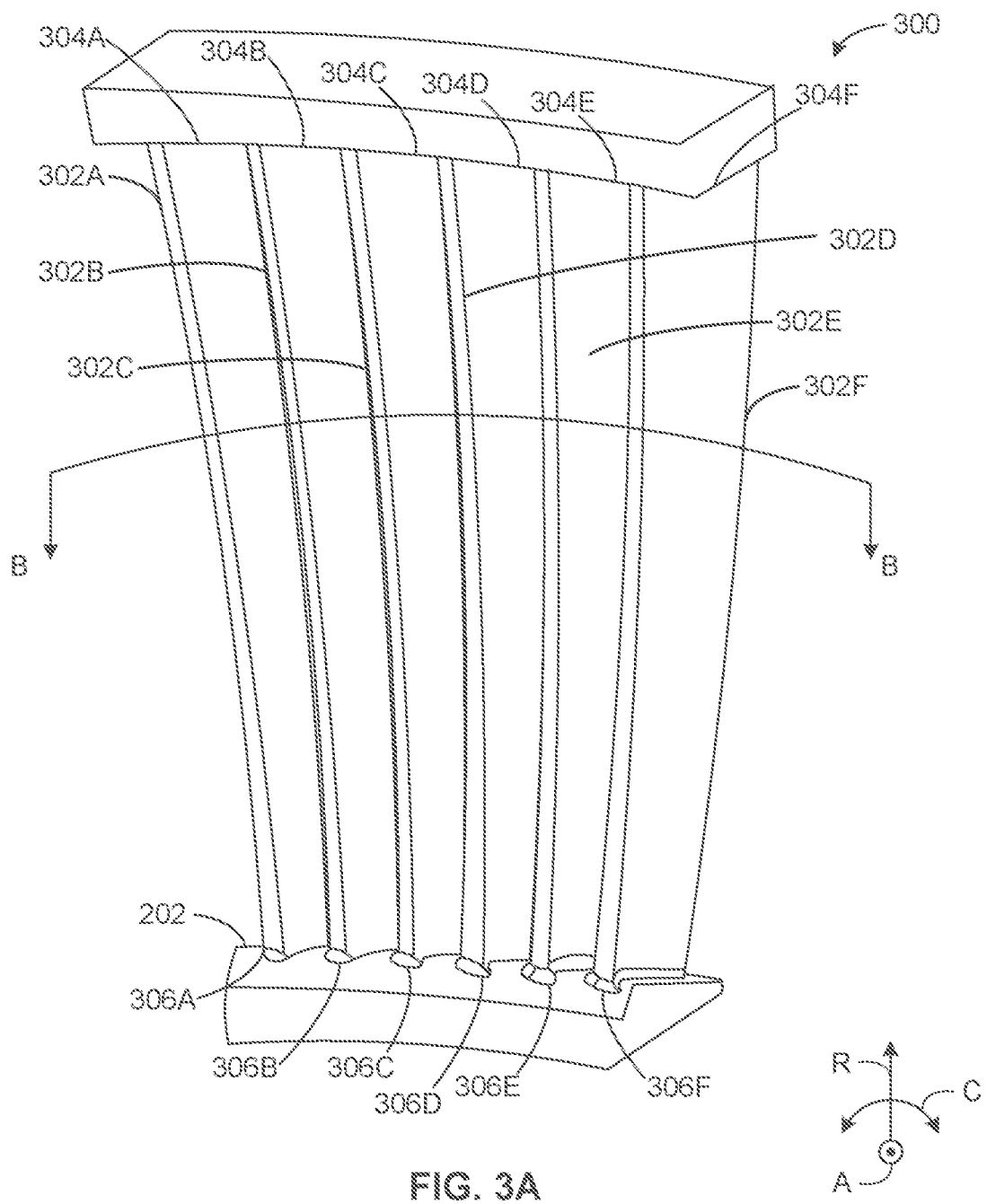
FIG. 3A illustrates a portion of a row of aerodynamically mistuned airfoils implemented in accordance with the teachings of this disclosure.

FIG. 3A illustrates an example portion 300 of a row of aerodynamically mistuned airfoils implemented in accordance with the teachings of the present disclosure. In the illustrated example of FIG. 3A, the portion 300 includes the disk 202 including an example first airfoil 302A, an example second airfoil 302B, an example third airfoil 302C, an example fourth airfoil 302D, an example fifth airfoil 302E, and an example sixth airfoil 302F. In the illustrated example of FIG. 3A, the first airfoil 302A includes an example first tip 304A and an example first root 306A, the second airfoil 302B includes an example second tip 304B and an example second root 306B, the third airfoil 302C includes an example third tip 304C and an example third root 306C, the fourth airfoil 302D includes an example fourth tip 304D and an example fourth root 306D, the fifth airfoil 302E includes an example fifth tip 304E and an example fifth root 306E, and the sixth airfoil 302F includes an example sixth tip 304F and an example sixth root 306F. In the illustrated example of FIG. 3A, the airfoils 302A, 302B, 302C, 302D, 302E, 302F are evenly spaced circumferentially around the disk 202 and have a non-uniform geometry. In the illustrated example of FIG. 3A, the airfoils 302A, 302B, 302C, 302D, 302E, 302F have variable thickness-to-chord ratios and/or maximum thicknesses.

Figure 3B:
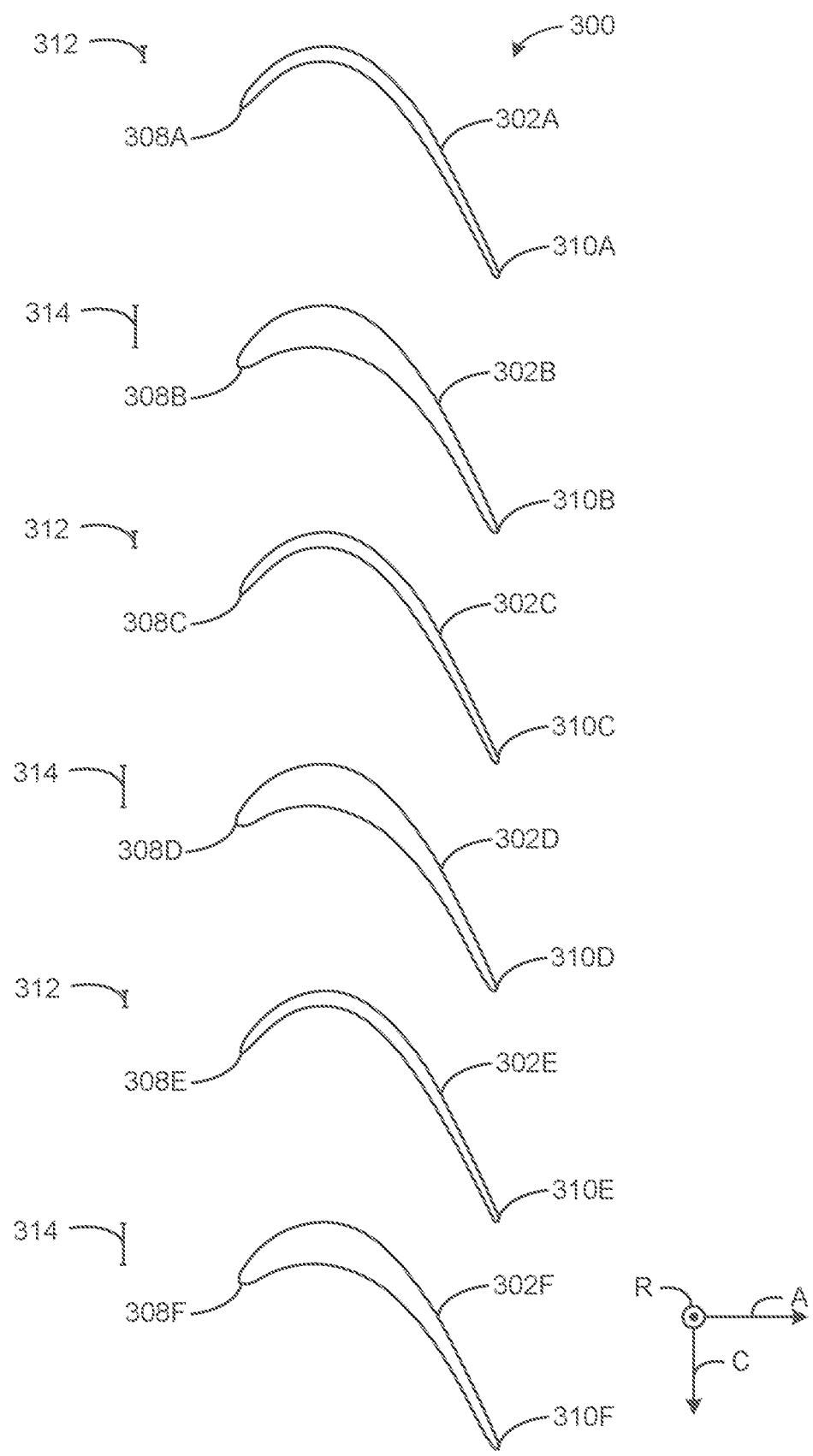
FIG. 3B illustrates a top view of the example row of aerodynamically mistuned airfoils implemented of FIG. 3A.

FIG. 3B illustrates a cross-sectional view of the portion 300 of the row aerodynamically mistuned airfoils of FIG. 3A along the cross-sectional view B-B of FIG. 3A. In the illustrated example of FIG. 3A, the first airfoil 302A includes an example first leading edge 308A and an example first trailing edge 310A, the second airfoil 302B includes an example second leading edge 308B and an example second trailing edge 310B, the third airfoil 302C includes an example third leading edge 308C and an example third trailing edge 310C, the fourth airfoil 302D includes an example fourth leading edge 308D and an example fourth trailing edge 310D, the fifth airfoil 302E includes an example fifth leading edge 308E and an example fifth trailing edge 310E, and the sixth airfoil 302F includes an example sixth leading edge 308F and an example sixth trailing edge 310F.

The airfoils 302A, 302C, 302E have a different geometry than the airfoils 302B, 302D, 302F. In the illustrated example of FIG. 3B, the first airfoil 302A, the third airfoil 302C, and the fifth airfoil 302E have an example first maximum thickness 312. In the illustrated example of FIG. 3B, the second airfoil 302B, the fourth airfoil 302D, and the sixth airfoil 302F have an example second maximum thickness 314. In the illustrated example of FIG. 3B, the second maximum thickness 314 is greater than the first maximum thickness 312 (e.g., one and half times greater, twice greater, three times greater, four times greater, etc.).

In the illustrated example of FIGS. 3A and 3B, each of the airfoils 302A, 302B, 302C, 302D, 302E, 302F have the same chord length. In such examples, the airfoils 302B, 302D, 302F have a greater thickness-to-chord ratio than the airfoils 302A, 302C, 302E. In the illustrated example of FIG. 3B, the chordwise location of the maximum thicknesses 312, 314 on the corresponding ones of the airfoils 302A, 302B, 302C, 302D, 302E, 302F is the same. In other examples, the chordwise location of the maximum thicknesses 312, 314 on the corresponding ones of the airfoils 302A, 302B, 302C, 302D, 302E, 302F can be in a different location (e.g., the location of the first maximum thickness 312 on the airfoils 302A, 302C, 302E can be closer to the respective ones of leading edges 308A, 308B, 308C, 308D, 308E, 308F than the second maximum thickness 314 on the airfoils 302B, 302D, 302F, the location of the first maximum thickness 312 on the airfoils 302A, 302C, 302E can be closer to the respective ones of the trailing edges 310A, 310B, 310C, 310D, 310E, 310F than the second maximum thickness 314 on the airfoils 302B, 302D, 302F, etc.). In the illustrated example of FIG. 3B, other than the maximum thickness 312, 314, the airfoils 302A, 302B, 302C, 302D, 302E, 302F have the same geometric properties (e.g., the same pressure distribution profiles, the same pressure-side curvature profile, the suction-side inner curvature profile, the same chord length, etc.) and same circumferential spacing. In some examples, airfoils with a maximum thickness different than the maximum thicknesses 312, 314 can be included in the blade row associated with the portion 300. In such examples, the blade row can include airfoils with three or more different maximum thicknesses and/or thickness-to-chord ratio.

Figure 3C:
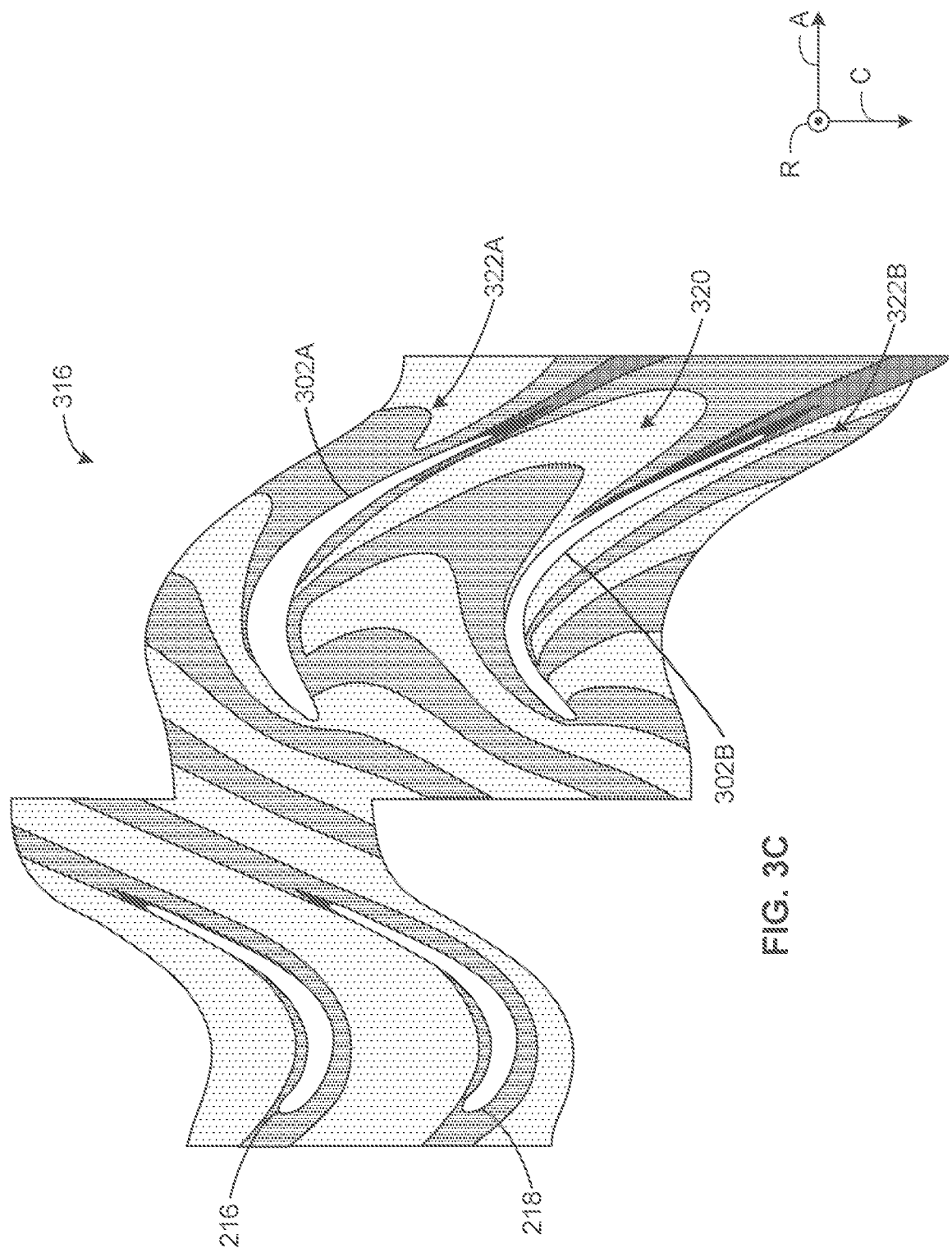
FIG. 3C illustrates an example wake field generated by the aerodynamically mistuned airfoils of FIGS. 3A and 3B during operation of the gas turbine engine of FIG. 1.

FIG. 3C illustrates an example wake field 316 generated by the aerodynamically mistuned airfoils 302A, 302B of FIGS. 3A and 3B during operation of the turbofan 100 of FIG. 1. In the illustrated example of FIG. 3, the airfoils 302A, 302B form an example channel 320. The channel 320 is circumferentially adjacent to an example first adjacent channel 322A and an example second adjacent channel 322B. In FIG. 3C, the wake field 316 generated by the upstream airfoils 216, 218 and the other airfoils of the airfoil row passes through the channels (e.g., the channels 320, 322A, 322B, etc.) created by the downstream airfoil row associated with the portion 300. In the illustrated example of FIG. 3, because the airfoils 302A, 302B are not uniform in geometry (e.g., have the maximum thicknesses 312, 314, etc.), the airfoils 302A, 302B are aerodynamically mistuned and disrupt the wake field 316. As such, the wake passing time of the wake field 316 through the channel 320 is non-periodic, and thus the wake passing through the channel 320 is not synchronized with the wake passing through the channels 322A, 322B. Because the wake characteristics of the wake field 316 in the channel 320 are non-uniform and not periodic in comparison to the adjacent channels 322A, 322B, the wake field 316 mitigates the negative aeromechanic, resonance, and aerodynamic effects associated with the airfoil row configurations of FIGS. 2A-2C.

Figure 4A:
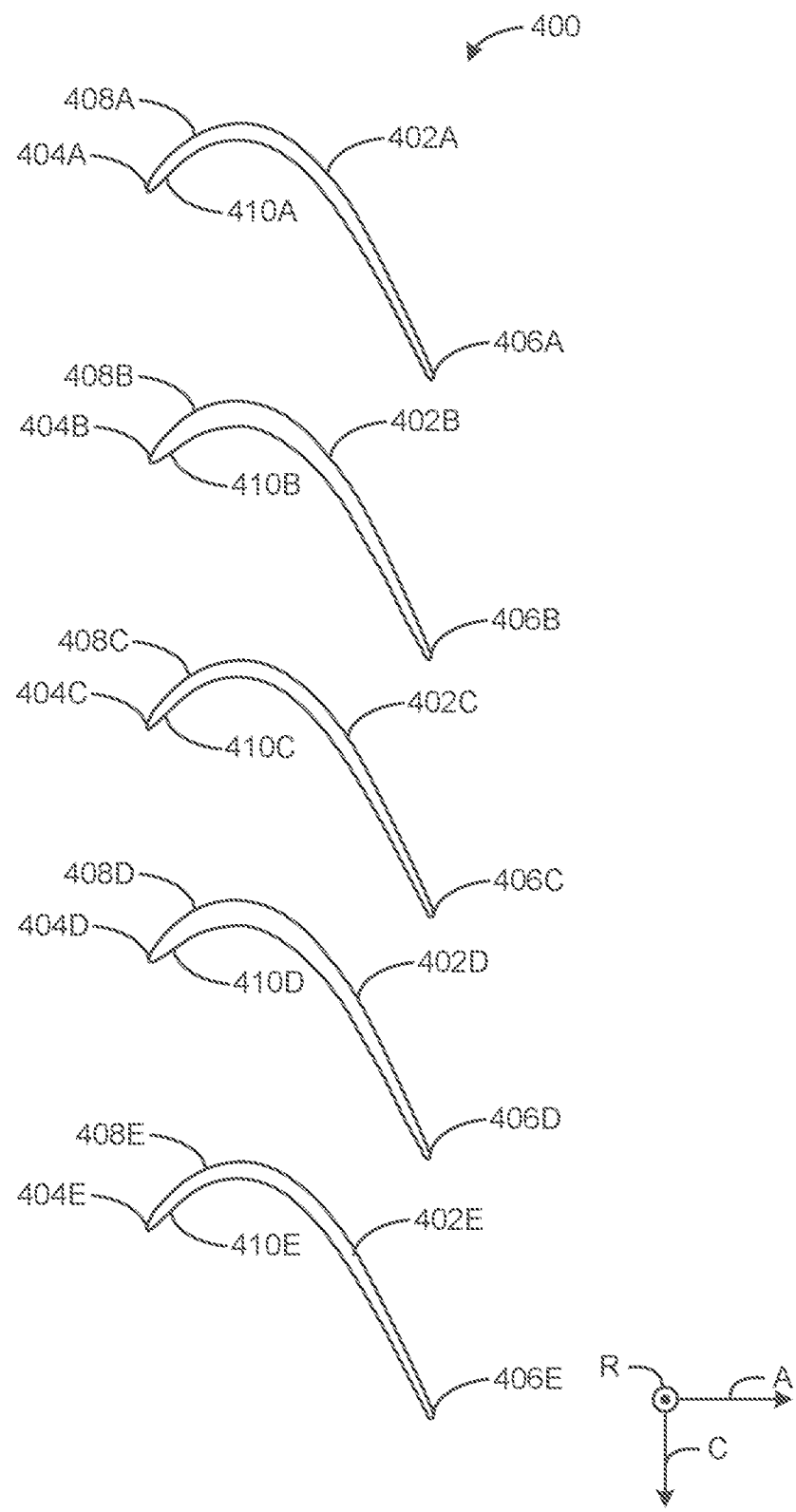
FIG. 4A illustrates another example row of aerodynamically mistuned airfoils implemented in accordance with the teachings of this disclosure.

FIG. 4A is a cross-sectional view of another example portion 400 a row of aerodynamically mistuned airfoils implemented in accordance with the teachings of this disclosure. The portion 400 includes an example first airfoil 402A, an example second airfoil 402B, an example third airfoil 402C, an example fourth airfoil 402D, and an example fifth airfoil 402E. In the illustrated example of FIG. 4A, the first airfoil 402A includes an example first leading edge 404A, an example first trailing edge 406A, an example first suction side 408A, and an example first pressure side 410A. In the illustrated example of FIG. 4B, the second airfoil 402B includes an example second leading edge 404B, an example second trailing edge 406B, an example second suction side 408B, and an example second pressure side 410B. In the illustrated example of FIG. 4A, the third airfoil 402C includes an example third leading edge 404C, an example third trailing edge 406C, an example third suction side 408C, and an example third pressure side 410C. In the illustrated example of FIG. 4A, the fourth airfoil 402D includes an example fourth leading edge 404D, an example fourth trailing edge 406D, an example fourth suction side 408D, and an example fourth pressure side 410D. In the illustrated example of FIG. 4A, the fifth airfoil 402E includes an example fifth leading edge 404E, an example fifth trailing edge 406E, an example fifth suction side 408E, and an example fifth pressure side 410E. In the illustrated example of FIG. 4A, the cross-sectional view of the portion 400 corresponds to an airfoil and disk configuration similar to the one illustrated in FIG. 3A, taken along the line B-B.

The airfoils 402A, 402C, 402E have a different geometry than the airfoils 402B, 402D. In the illustrated example of FIG. 4A, the airfoils 402B, 402D have geometries that have axial pressure distributions that are comparatively front-loaded (e.g., greater pressure coefficients closer to corresponding ones of the leading edges 404A, 404B, 404C, 404D, 404E, etc.) when compared to the airfoils 402A, 402C, 402E. For example, the airfoils 402B, 402D have the suction sides 408B, 408D with different curvature profile(s) than the suction sides 408A, 408C, 408E, and pressure sides 410B, 410C different curvature profile(s) than the pressure sides 410A, 410C, 410E, such that the pressure coefficient/differential of the airfoils 402B, 402D is comparable greater near the leading edges 404B, 404D. In other examples, the airfoils 402B, 402D can have any other suitable geometric configurations (e.g., different curvature profile(s), different cambers, different thicknesses, etc.) that cause the axial pressure distribution on the airfoils 402B, 402D to be comparatively front-loaded. In the illustrated example of FIG. 4A, the airfoils 402A, 402B, 402C, 402D, 402E have the same chord length and same circumferential spacing. In other examples, the 402A, 402B, 402C, 402D, 402E can have different chord lengths and different circumferential spacing. In some examples, airfoils with curvature profiles and/or axial pressure distribution different than the airfoils 402A, 402B, 402C, 402D, 402E can be included in the blade row associated with the portion 400. In such examples, the blade row of FIG. 4A can include airfoils with three or more different geometries with corresponding different axial pressure distributions.

Figure 4B:
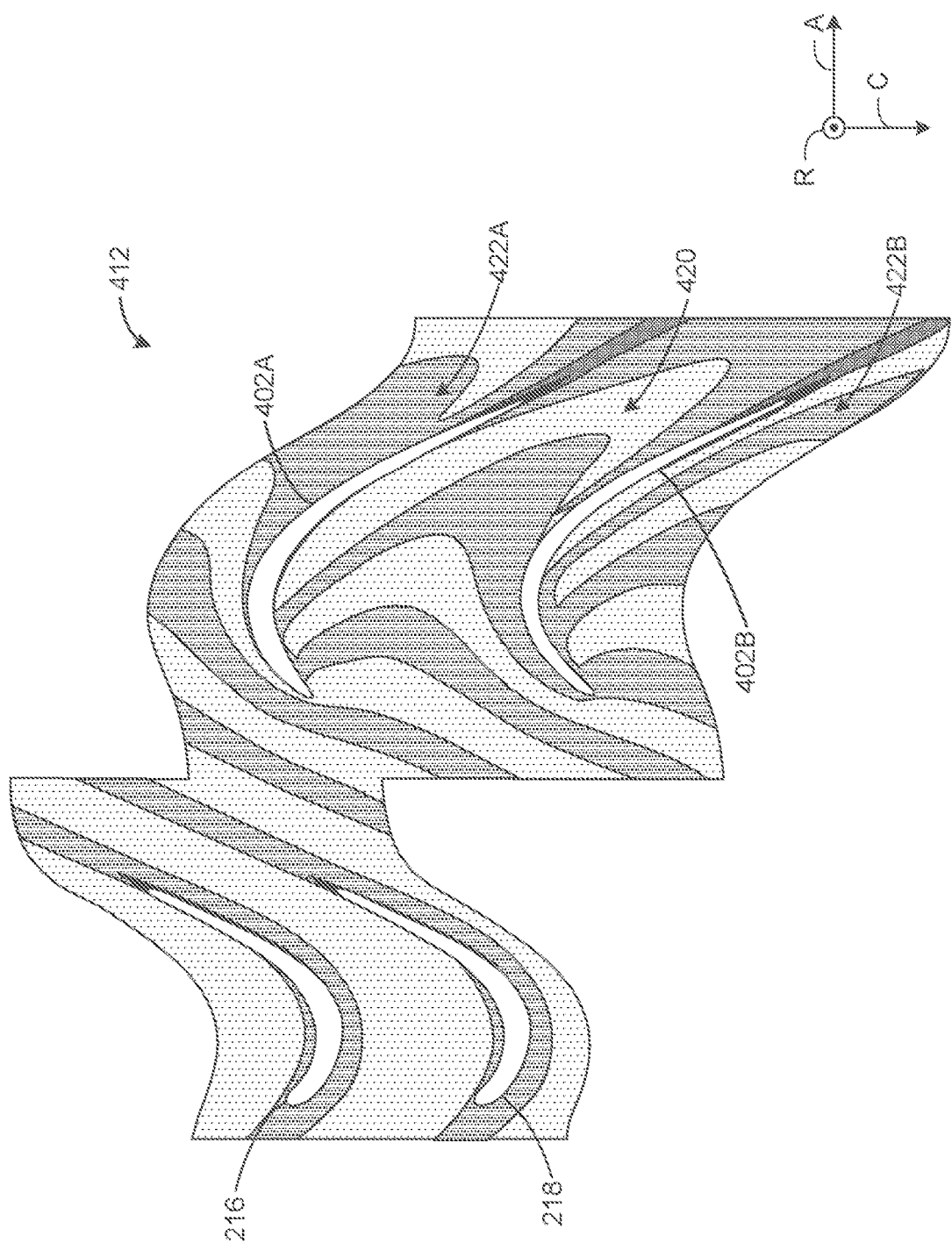
FIG. 4B illustrates an example wake field generated by the airfoils of FIG. 4A during operation of the gas turbine engine of FIG. 1.

FIG. 4B illustrates an example wake field 412 generated by the aerodynamically mistuned airfoils 402A, 402B of FIG. 4A during operation of the turbofan 100 of FIG. 1. In the illustrated example of FIG. 4B, the airfoils 402A, 402B form an example channel 420. The channel 420 is circumferentially adjacent to an example first adjacent channel 422A and an example second adjacent channel 422B. In FIG. 4B, the wake field 412 generated by the upstream airfoils 216, 218 and the other airfoils of the airfoil row passes through the channels (e.g., the channel 420, 422A, 422B, etc.) created by the downstream airfoil row associated with the portion 400. In the illustrated example of FIG. 4B, because the airfoils 402A, 402B are not uniform in geometry (e.g., different axial pressure distributions, different suction side curvature profiles, different pressure side curvature profiles, etc.), the airfoils 402A, 402B are aerodynamically mistuned and disrupt the wake field 412. As such, the wake passing time of the wake field 412 through the channel 420 is non-periodic and thus the wake passing through the channel 420 is not synchronized with the wake passing through the channels 422A, 422B. Because the wake characteristics of the wake field 412 in the channel 420 are non-uniform and not periodic in comparison to the channels 422A, 422B, the wake field 412 mitigates the negative aeromechanic, resonance, and aerodynamic effects associated with the airfoil row configurations of FIGS. 2A-2C.

Figure 5A:
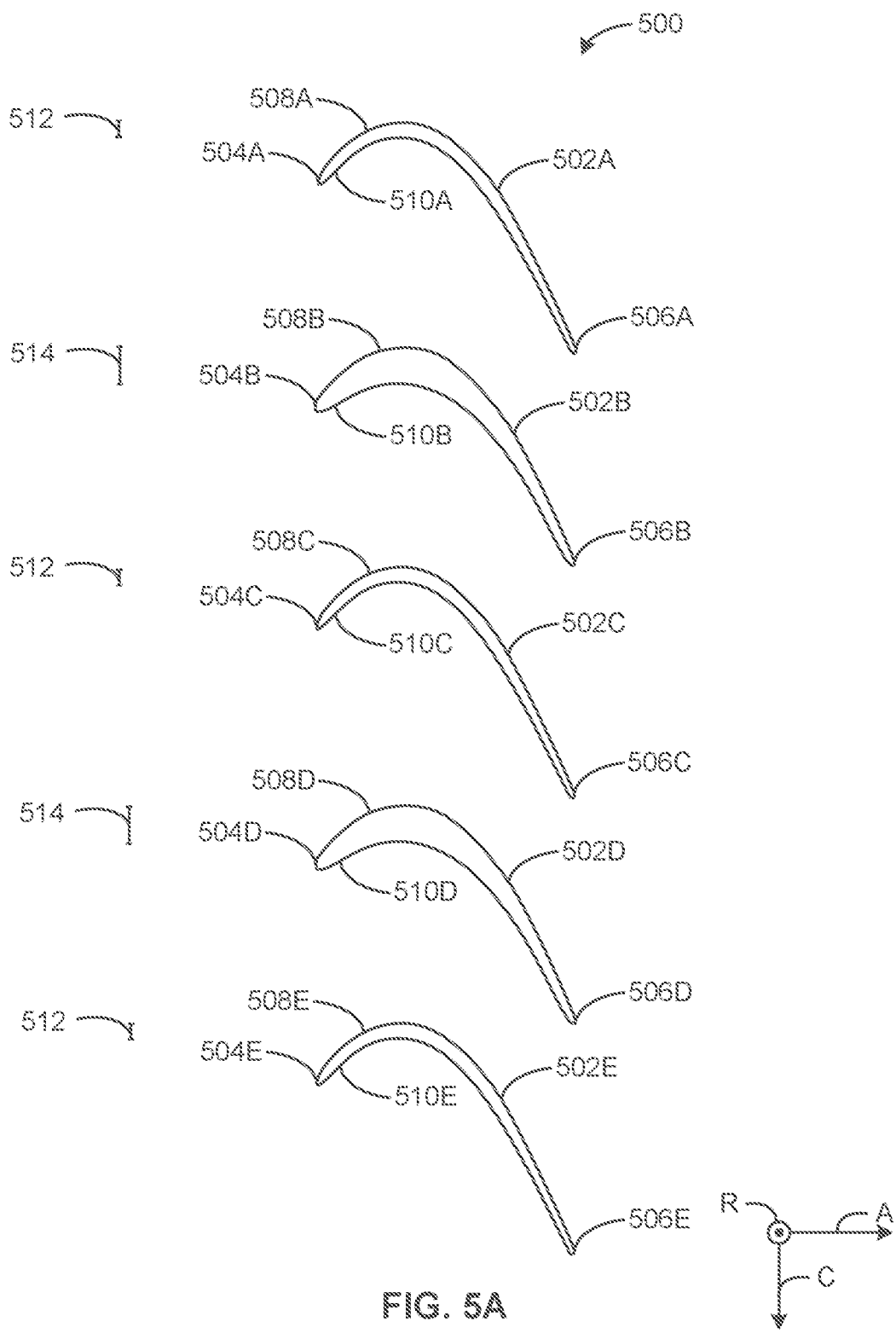
FIG. 5A illustrates another example row of aerodynamically mistuned airfoils implemented in accordance with the teachings of this disclosure.

FIG. 5A is a cross-sectional view of another example portion 500 a row of aerodynamically mistuned airfoils implemented in accordance with the teachings of this disclosure. The portion 500 includes an example first airfoil 502A, an example second airfoil 502B, an example third airfoil 502C, an example fourth airfoil 502D, and an example fifth airfoil 502E. In the illustrated example of FIG. 5A, the first airfoil 502A includes an example first leading edge 504A, an example first trailing edge 506A, an example first suction side 508A, and an example first pressure side 510A. In the illustrated example of FIG. 5A, the second airfoil 502B includes an example second leading edge 504B, an example second trailing edge 506B, an example second suction side 508B, and an example second pressure side 510B. In the illustrated example of FIG. 5A, the third airfoil 502C includes an example third leading edge 504C, an example third trailing edge 506C, an example third suction side 508C, and an example third pressure side 510C. In the illustrated example of FIG. 5A, the fourth airfoil 502D includes an example fourth leading edge 504D, an example fourth trailing edge 506D, an example fourth suction side 508D, and an example fourth pressure side 510D. In the illustrated example of FIG. 5A, the fifth airfoil 502E includes an example fifth leading edge 504E, an example fifth trailing edge 506E, an example fifth suction side 508E, and an example fifth pressure side 510E. In the illustrated example of FIG. 5A, the first airfoil 502A, the third airfoil 502C, and the fifth airfoil 502E have an example first maximum thickness 512. In the illustrated example of FIG. 5A, the second airfoil 502B and the fourth airfoil 502D have an example second maximum thickness 514. In the illustrated example of FIG. 5A, the cross-sectional view of the portion 500 corresponds to an airfoil and disk configuration like the one illustrated in FIG. 3A, taken along the line B-B.

The airfoils 502A, 502C, 502E have a different geometry than the airfoils 502B, 502D. In the illustrated example of FIG. 5A, the airfoils 502B, 502D have geometries that cause have axial pressure distributions that are comparatively aft-loaded (e.g., greater pressure coefficients closer to corresponding ones of the trailing edges 506A, 506B, 506C, 506D, etc.) when compared to the airfoils 502A, 502C, 502E. For example, the airfoils 502B, 502D have the suction sides 508B, 508D with different curvature profile(s) than the suction sides 508A, 508C, 508E, and pressure sides 510B, 510C with different curvature profile(s) than the pressure sides 510A, 510C, 510E, such that the pressure coefficient/differential of the airfoils 502B, 502D is comparable greater near the trailing edges 506B, 506D. In other examples, the airfoils 502B, 502D can have any other suitable geometric configurations (e.g., different curvatures, different cambers, etc.) that cause the axial pressure distribution on the airfoils 502B, 502D to be comparatively ft-loaded.

In the illustrated example of FIG. 5A, the second maximum thickness 514 is greater than the first maximum thickness 512 (e.g., one and half times greater, twice greater, three times greater, 5 times greater, etc.). In the illustrated example of FIG. 5A, the second maximum thickness 514 is greater than the first maximum thickness 512 (e.g., one and half times greater, twice greater, three times greater, 5 times greater, etc.). In such examples, the airfoils 502B, 502D have a greater thickness-to-chord ratio the airfoils 502A, 502C, 502E. In the illustrated example of FIG. 5A, the airfoils 502A, 502B, 502C, 502D, 502E have the same chord length and same circumferential spacing. In other examples, the 502A, 502B, 502C, 502D, 502E can have different chord lengths and different circumferential spacing. In some examples, airfoils with curvature profiles and/or axial pressure distribution different than the airfoils 502A, 502B, 502C, 502D, 502E can be included in the blade row associated with the portion 500. In such examples, the blade row of FIG. 5A can include airfoils with three or more different geometries with corresponding different axial pressure distributions, chord-ratios and/or maximum thickness.

Figure 5B:
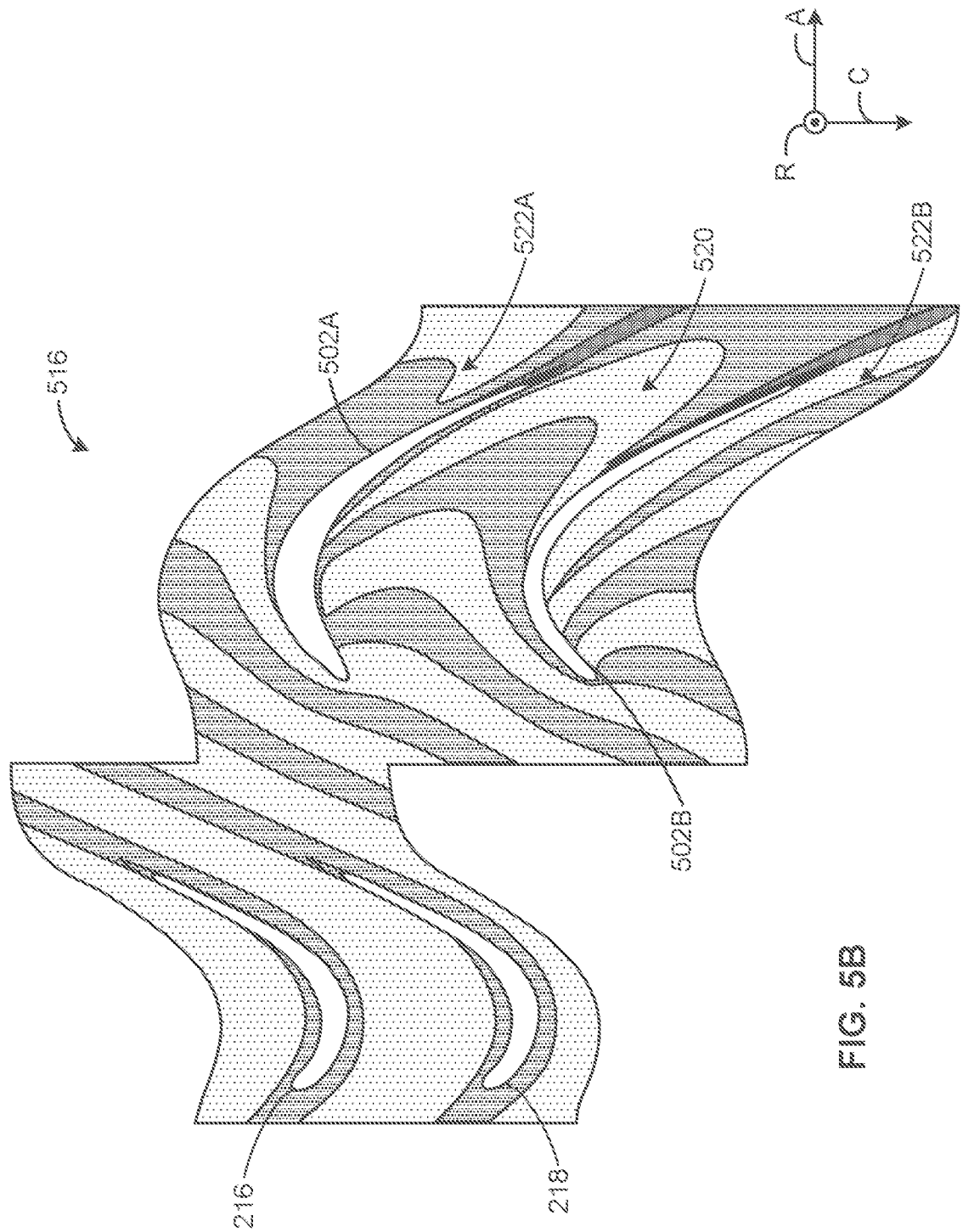
FIG. 5B illustrates an example wake field generated by the airfoils of FIG. 5A during operation of the gas turbine engine of FIG. 1.

FIG. 5B illustrates an example wake field 516 generated by the aerodynamically mistuned airfoils 502A, 502B of FIG. 5A during operation of the turbofan 100 of FIG. 1. In the illustrated example of FIG. 5B, the airfoils 502A, 502B form an example channel 520. The channel 520 is circumferentially adjacent to an example first adjacent channel 522A and an example second adjacent channel 522B. In FIG. 5B, the wake field 516 generated by the upstream airfoils 216, 218 and the other airfoils of the airfoil row passes through the channels (e.g., the channel 520, etc.) created by the downstream airfoil row associated with the portion 500. In the illustrated example of FIG. 5B, because the airfoils 502A, 502B are not uniform in geometry (e.g., have the different thicknesses 512, 514, different pressure distributions, different curvatures, etc.), the airfoils 502A, 502B are aerodynamically mistuned and disrupt the wake field 516. As such, the wake passing time of the wake field 516 through the channel 520 is non-periodic and thus the wake passing through the channel 520 is not synchronized with the wake passing through the channels 522A, 522B. Because the wake characteristics of the wake field 516 in the channel 520 are non-uniform and not periodic in comparison to the adjacent channels 522A, 522B, the wake field 516 mitigates the negative aeromechanic, resonance, and aerodynamic effects associated with the airfoil row configurations of FIGS. 2A-2C.

Figure 6A:
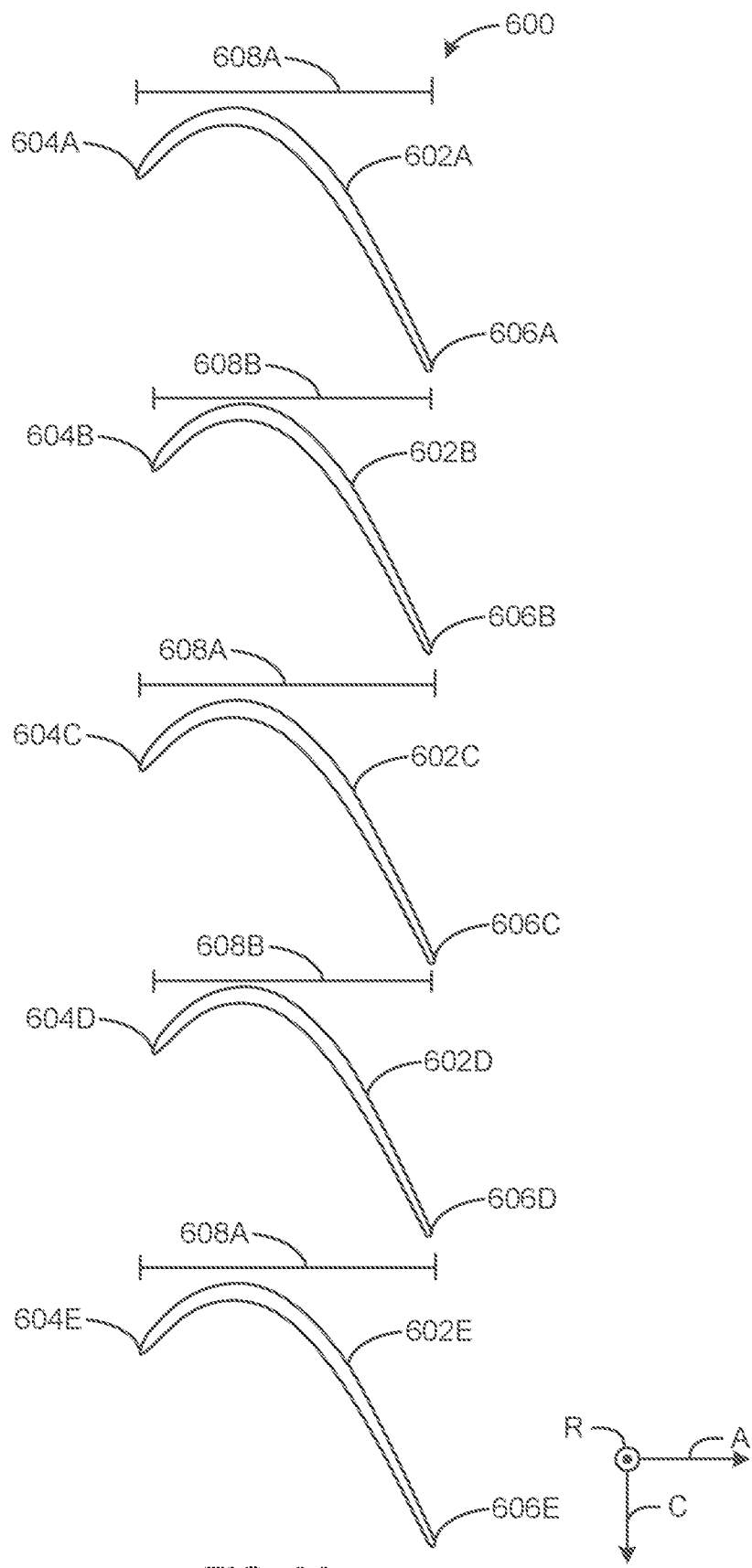
FIG. 6A illustrates another example row of aerodynamically mistuned airfoils implemented in accordance with the teachings of this disclosure.

FIG. 6A is a cross-sectional view of another example portion 600 a row of aerodynamically mistuned airfoils implemented in accordance with the teachings of this disclosure. The portion 600 includes an example first airfoil 602A, an example second airfoil 602B, an example third airfoil 602C, an example fourth airfoil 602D, and an example fifth airfoil 602E. In the illustrated example of FIG. 6A, the first airfoil 602A includes an example first leading edge 604A, and an example first trailing edge 606A. In the illustrated example of FIG. 6A, the second airfoil 602B includes an example second leading edge 604B, and an example second trailing edge 606B. In the illustrated example of FIG. 6A, the third airfoil 602C includes an example third leading edge 604C, and an example third trailing edge 606C. In the illustrated example of FIG. 6A, the fourth airfoil 602D includes an example fourth leading edge 604D, and an example fourth trailing edge 606D. In the illustrated example of FIG. 6A, the fifth airfoil 602E includes an example fifth leading edge 604E, and an example fifth trailing edge 606E. In the illustrated example of FIG. 6A, the first airfoil 602A, the third airfoil 602C, and the fifth airfoil 602E have an example first chord length 608A. In the illustrated example of FIG. 6A, the second airfoil 602B, and the fourth airfoil 602D have an example second chord length 608B. In the illustrated example of FIG. 6A, the cross-sectional view of the portion 600 corresponds to an airfoil and disk configuration like the one illustrated in FIG. 3A, taken along the line B-B.

The airfoils 602A, 602C, 602E have a different geometry than the airfoils 602B, 602D. In the illustrated example of FIG. 6A, the first chord length 608A is greater than the second chord length 608B (e.g., 10% greater, 25% greater, 50% greater, etc.). In the illustrated example of FIG. 6A, the leading edges 604B, 604D are axially displaced from the leading edges 604A, 604C, 604E (e.g., by the difference between the first chord length 608A and the second chord length 608B, etc.) and the trailing edges 606A, 606B, 606C, 606D, 606E are axially aligned. In other examples, the leading edges 604A, 604B, 604C, 604D, 604E can be axially aligned and the trailing edges 606B, 606D can be axially displaced from the trailing edges 606A, 606C, 606E. In other examples, the trailing edges 606B, 606D can be axially displaced from the trailing edges 606A, 606C, 606E and the leading edges 604B, 604D are axially displaced from the leading edges 604A, 604C, 604E. In the illustrated example of FIG. 6A, other than the different chord lengths 608A, 608B, the airfoils 602A, 602B, 602C, 602D, 602E have the same geometric properties (e.g., the same pressure distribution profiles, the same pressure-side curvature profile, the suction-side inner curvature profile, the same thickness, etc.) and same circumferential spacing. In some examples, airfoils with chord lengths different than the chord lengths 608A, 608B of FIG. 6A can be included in the blade row associated with the portion 600. In such examples, the blade row of FIG. 6A can include airfoils with three or more different geometries with corresponding different chord lengths.

Figure 6B:
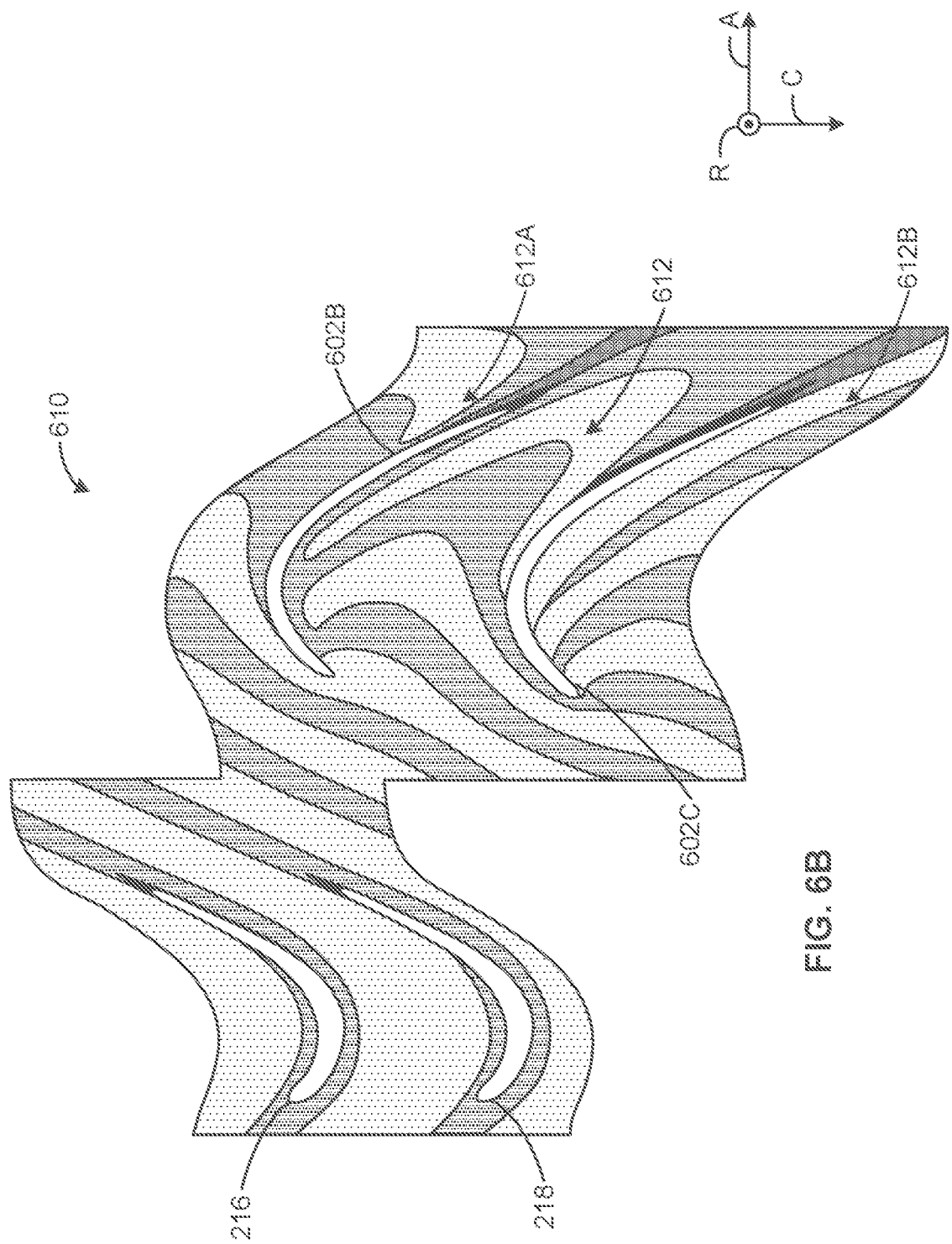
FIG. 6B illustrates an example wake field generated by the airfoils of FIG. 6A during operation of the gas turbine engine of FIG. 1.

FIG. 6B illustrates an example wake field 610 generated by the upstream airfoils 216, 218 and the aerodynamically mistuned airfoils 602A, 602B of FIG. 6A during operation of the turbofan 100 of FIG. 1. In the illustrated example of FIG. 6B, the airfoils 602A, 602B form an example channel 612. The channel 612 is circumferentially adjacent to an example first adjacent channel 614A and an example second adjacent channel 614B. In FIG. 6B, the wake field 610 generated by the upstream airfoils 216, 218 and the other airfoils of the airfoil row passes through the channels (e.g., the channel 612, etc.) created by the downstream airfoil row associated with the portion 600. In the illustrated example of FIG. 6B, because the airfoils 602A, 602B are not uniform in geometry (e.g., different chord lengths 608A, 608B, etc.), the airfoils 602A, 602B are aerodynamically mistuned and disrupt the wake field 610. As such, the wake passing time of the wake field 610 is non-periodic and thus the wake passing through the channel 612 is not synchronized with the wake passing through the channels 614A, 614B. Because the wake characteristics of the wake field 610 in the channel 612 are non-uniform and not periodic in comparison to the adjacent channels 614A, 614B, the wake field 610 mitigates the negative aeromechanic, resonance, and aerodynamic associated with the airfoil row configurations of FIGS. 2A-2C.

Figure 7:
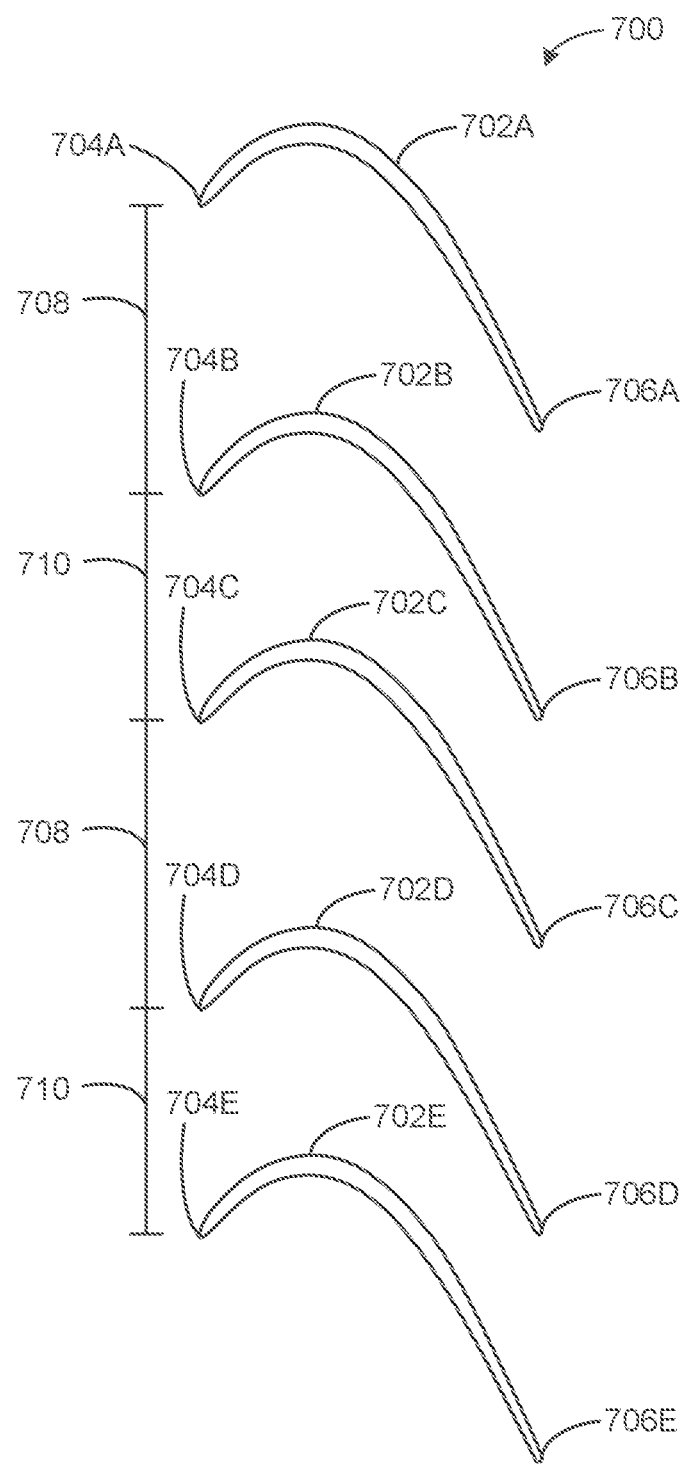
FIG. 7 illustrate another example row of aerodynamically mistuned airfoils implemented in accordance with the teachings of this disclosure.

FIG. 7 is a cross-sectional view of another example portion 700 a row of aerodynamically mistuned airfoils implemented in accordance with the teachings of this disclosure. The portion 700 includes an example first airfoil 702A, an example second airfoil airfoil 702E. In the illustrated example of FIG. 7, the first airfoil 702A includes an example first leading edge 704A, and an example first trailing edge 706A. In the illustrated example of FIG. 7, the second airfoil 702B includes an example second leading edge 704B, and an example second trailing edge 706B. In the illustrated example of FIG. 7, the third airfoil 702C includes an example third leading edge 704C, and an example third trailing edge 706C. In the illustrated example of FIG. 7, the fourth airfoil 702D includes an example fourth leading edge 704D, and an example fourth trailing edge 706D. In the illustrated example of FIG. 7, the fifth airfoil 702E includes an example fifth leading edge 704E, and an example fifth trailing edge 706E. In the illustrated example of FIG. 7, the first airfoil 702A and the third airfoil 702C is spaced an example first distance 708 from the second airfoil 702B and the fourth airfoil 702D, respectively. In the illustrated example of FIG. 7, the second airfoil 702B and the fourth airfoil 702D is spaced an example second distance 710 from the third airfoil 702C and the fifth airfoil 702E, respectively. In the illustrated example of FIG. 7, the cross-sectional view of the portion 700 corresponds to an airfoil and disk configuration like the one illustrated in FIG. 3A, taken along the line B-B.

The airfoils 702A, 702C, 702E have a different geometry than the airfoils 702B, 702D. In the illustrated example of FIG. 7, the first distance 708 is the length of the gap between the first leading edge 704A and the second leading edge 704B, the length of the gap between the third leading edge 704C and the fourth leading edge 704D, the length of the gap between the first trailing edge 706A and the second trailing edge 706B, and the length of the gap between the third trailing edge 706C and the fourth trailing edge 706D. In the illustrated example of FIG. 7, the second distance 710 is the length of the gap between the second leading edge 704B and the third leading edge 704C, the length of the gap between the fourth leading edge 704D and the fourth leading edge 704D, the length of the gap between the second trailing edge 706B and the fourth trailing edge 706D, and the length of the gap between the fourth trailing edge 706D and the fifth trailing edge 706E. In other examples, the distance between leading edges and trailing edges of adjacent airfoils can be different (e.g., a different distance between the leading edges 704A, 704B and the trailing edges 706A, 706B, etc.). In FIG. 7, the distances 708, 710 between the airfoils 702A, 702B, 702C, 702D, 702E alternate. In other examples, the pattern of the gap formed between the airfoils 702A, 702B, 702C, 702D, 702E can be any suitable pattern (e.g., a different distance every third airfoil, a different distance every fourth airfoil, etc.). In the illustrated example of FIG. 7, the first distance 708 is greater than the second distance 710 (e.g., 10% longer, 25% longer, 50% longer, twice as long, etc.). The difference between the distances 708, 710 between the airfoils 702A, 702B, 702C, 702D, 702E create a wake disturbing effect in adjacent downstream channels similar to the effect illustrated in FIGS. 3C, 4B, 5B and 6B.

FIGS. 3A-7 describe aerodynamically mistuned airfoils with different geometries and/or spacing. The present disclosure is not limited to these specific configurations and can include other potential configurations. For example, airfoils with different thickness-to-chord ratios (e.g., similar to the airfoils 302A, 302B, 302C, 302D, 302E, 302F of FIG. 3B, etc.) can have variable circumferential spacing (e.g., similar to the airfoils 702A, 702B, 702C, 702D, 702E of FIG. 7, etc.).

Examples disclosed herein reduce unsteady flow, thus offering reduced flutter, improved profile losses, and improved forced response dumping when compared to prior designs. Examples disclosed herein improve the performance of gas turbine engines by improving the aeromechanical and aerodynamic response of airfoils disposed therein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the present disclosure are provided by the subject matter of the following clauses:

Aerodynamically mistuned airfoils for unsteady loss reduction are disclosed herein. Further examples and combinations thereof include the following:

Example 1 includes an apparatus comprising a disk, a first airfoil coupled to the disk, the first airfoil having a first geometry, a second airfoil coupled to the disk adjacent to the first airfoil, the second airfoil having a second geometry different than the first geometry, a first channel between the first airfoil and the second channel, and a second channel adjacent to the first channel, the first airfoil and the second airfoil producing non-uniform wake passing times in the first channel and the second channel during operation of the disk.

Example 2 of any preceding clause, wherein the disk is a rotor disk of a gas turbine engine.

Example 3 of any preceding clause, further including a third airfoil coupled to the disk adjacent to the second airfoil, the third airfoil having the first geometry.

Example 4 of any preceding clause, further including a third airfoil coupled to the disk adjacent to the second airfoil, the second airfoil having a third geometry, the third geometry different than the second geometry.

Example 5 of any preceding clause, wherein the second airfoil is spaced a first distance from the first airfoil, and the third airfoil is spaced a second distance from the third airfoil, the first distance different than the second distance.

Example 6 of any preceding clause, wherein the first geometry includes a first thickness-to-chord ratio and the second geometry includes a second thickness-to-chord ratio, the first thickness-to-chord ratio different than the second thickness-to-chord ratio.

Example 7 of any preceding clause, wherein the first geometry includes having a first curvature with a corresponding first axial pressure distribution, and the second geometry includes a second curvature with a corresponding second axial pressure distribution, the first axial pressure distribution different the second axial pressure distribution.

Example 8 of any preceding clause, wherein the first geometry includes a first thickness-to-chord ratio, the first geometry including a first curvature with a corresponding first axial pressure distribution, and the second geometry includes a second thickness-to-chord ratio, the second geometry including a second curvature with a corresponding second axial pressure distribution, the first axial pressure distribution different the second axial pressure distribution.

Example 9 of any preceding clause, wherein the first geometry has a first chord length, and the second geometry has a second chord length, the first chord length different than the second chord length.

Example 10 of any preceding clause, wherein the disk is a component of a low pressure turbine.

Example 11 includes a section of a gas turbine engine comprising a first row of airfoils including a first airfoil having a first geometry, and a second airfoil disposed adjacent to the first airfoil, the second airfoil having a second geometry different than the first geometry, and a second row of airfoils defining a plurality of channels therebetween, the second row downstream and axially adjacent to the first row, the plurality of channels including a first channel to receive first wake characteristics from the first row, and a second channel to receive second wake characteristics from the first row, the first wake characteristics different than the second wake characteristics.

Example 12 of any preceding clause, wherein the first row is a stator row and the second row is a rotor row.

Example 13 of any preceding clause, wherein the first row further includes a third airfoil adjacent to the second airfoil, the third airfoil having the first geometry.

Example 14 of any preceding clause, wherein the first row further includes a third airfoil adjacent to the second airfoil, the third airfoil having a third geometry, the third geometry different than the second geometry.

Example 15 of any preceding clause, wherein the second airfoil is spaced a first distance from the first airfoil, and the third airfoil is spaced a second distance from the third airfoil, the first distance different than the second distance.

Example 16 of any preceding clause, wherein the first geometry includes a first thickness-to-chord ratio and the second geometry includes a second thickness-to-chord ratio, the first thickness-to-chord ratio different than the second thickness-to-chord ratio.

Example 17 of any preceding clause, wherein the first geometry includes having a first curvature with a corresponding first axial pressure distribution, and the second geometry includes a second curvature with a corresponding second axial pressure distribution, the first axial pressure distribution different the second axial pressure distribution.

Example 18 of any preceding clause, wherein the first geometry includes a first thickness-to-chord ratio, the first geometry including a first curvature with a corresponding first axial pressure distribution, and the second geometry includes a second thickness-to-chord ratio, the second geometry including a second curvature with a corresponding second axial pressure distribution, the first axial pressure distribution different the second axial pressure distribution.

Example 19 of any preceding clause, wherein the first geometry has a first chord length, and the second geometry has a second chord length, the first chord length different than the second chord length.

Example 20 of any preceding clause, wherein the section is a low pressure turbine.

The following claims are hereby incorporated into this Detailed Description by this reference, with each claim standing on its own as a separate embodiment of the present disclosure.

What is claimed is:

1. An apparatus comprising:
a disk;
a first airfoil coupled to the disk, the first airfoil having a first geometry including a first curvature with a corresponding first axial pressure distribution; and
a second airfoil coupled to the disk adjacent to the first airfoil, the second airfoil having a second geometry including a second curvature with a corresponding second axial pressure distribution, the first axial pressure distribution different than the second axial pressure distribution, the second airfoil having a same root-to-tip span length as the first airfoil;
a first channel between the first airfoil and the second airfoil; and
a second channel adjacent to the first channel, the first airfoil and the second airfoil producing non-uniform wake characteristics in the first channel and the second channel during operation of the disk,
wherein the disk is a rotor disk of a gas turbine engine,
wherein the first geometry includes a first thickness-to-chord ratio and the second geometry includes a second thickness-to-chord ratio, the first thickness-to-chord ratio different than the second thickness-to-chord ratio, and
wherein (1) the first thickness-to-chord ratio is less than the second thickness-to-chord ratio and (2) the second axial pressure distribution is more aft loaded than the first axial pressure distribution.

2. The apparatus of claim 1, further including a third airfoil coupled to the disk adjacent to the second airfoil, the third airfoil having the first geometry.

3. The apparatus of claim 2, wherein:
the second airfoil is spaced a first distance from the first airfoil; and
the third airfoil is spaced a second distance from the second airfoil, the first distance different than the second distance.

4. The apparatus of claim 1, wherein the first geometry and the second geometry have a same maximum thickness.

5. The apparatus of claim 1, wherein:
the first geometry has a first chord length; and
the second geometry has a second chord length, the first chord length different than the second chord length.

6. The apparatus of claim 1, wherein the first curvature causes the first airfoil to have a first non-zero pressure loading, the second curvature causes the second airfoil to have a second non-zero pressure loading, the first non-zero pressure loading different than the second non-zero pressure loading.

7. A section of a gas turbine engine comprising:
a first row of airfoils; and
a second row of airfoils including:
a first airfoil having a first geometry including a first curvature with a corresponding first axial pressure distribution;
a second airfoil disposed adjacent to the first airfoil, the second airfoil having a second geometry including a second curvature with a corresponding second axial pressure distribution, the first axial pressure distribution different than the second axial pressure distribution, the second airfoil having a same root-to-tip span length as the first airfoil;
a first channel to receive first wake characteristics from the first row; and
a second channel to receive second wake characteristics from the first row, the first wake characteristics different than the second wake characteristics,
wherein the first row is a stator row and the second row is a rotor row,
wherein the first geometry includes a first thickness-to-chord ratio and the second geometry includes a second thickness-to-chord ratio, the first thickness-to-chord ratio different than the second thickness-to-chord ratio, and
wherein (1) the first thickness-to-chord ratio is less than the second thickness-to-chord ratio and (2) the second axial pressure distribution is more aft loaded than the first axial pressure distribution.

8. The section of claim 7, wherein the second row further includes a third airfoil adjacent to the second airfoil, the third airfoil having the first geometry.

9. The section of claim 8, wherein:
the second airfoil is spaced a first distance from the first airfoil; and
the third airfoil is spaced a second distance from the second airfoil, the first distance different than the second distance.

10. The section of claim 7, wherein the first geometry and the second geometry have a same maximum thickness.

11. The section of claim 7, wherein:
the first geometry has a first chord length; and
the second geometry has a second chord length, the first chord length different than the second chord length.

12. The section of claim 7, wherein the first curvature causes the first airfoil to have a first non-zero pressure loading, the second curvature causes the second airfoil to have a second non-zero pressure loading, the first non-zero pressure loading different than the second non-zero pressure loading.

* * * * *